(No Model.)  5 Sheets—Sheet 1.

P. PUVREZ.
APPARATUS FOR PASTEURIZING OR STERILIZING AND COOLING BEER, &c.

No. 548,392.  Patented Oct. 22, 1895.

Witnesses:
Chas. W. Thomas
Eugenie Preuder

Inventor:
Paul Puvrez,
By A. Faber du Faur
Attorney.

(No Model.)

P. PUVREZ.

APPARATUS FOR PASTEURIZING OR STERILIZING AND COOLING BEER, &c.

No. 548,392. Patented Oct. 22, 1895.

Witnesses:
Chas. N. Thomas
Eugenie Persider

Inventor:
Paul Puvrez,
BY A. Faber du Faur
Attorney.

(No Model.)  
5 Sheets—Sheet 3.

P. PUVREZ.
APPARATUS FOR PASTEURIZING OR STERILIZING AND COOLING BEER, &c.

No. 548,392.  
Patented Oct. 22, 1895.

Witnesses:  
Chas. W. Thomas.  
Eugenie Persides.

Inventor:  
Paul Puvrez,  
BY A. Faber du Faur  
Attorney.

(No Model.) 5 Sheets—Sheet 4.
P. PUVREZ.
APPARATUS FOR PASTEURIZING OR STERILIZING AND COOLING BEER, &c.
No. 548,392. Patented Oct. 22, 1895.
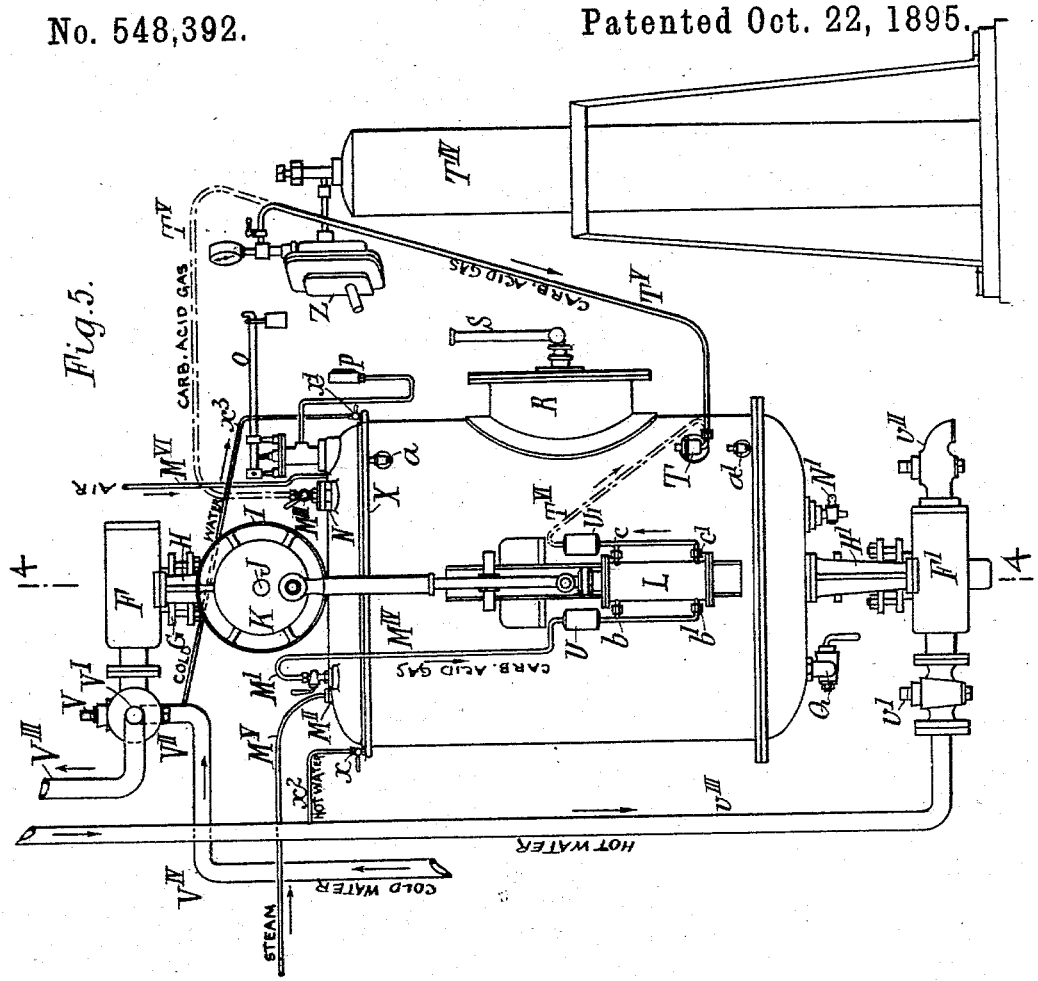
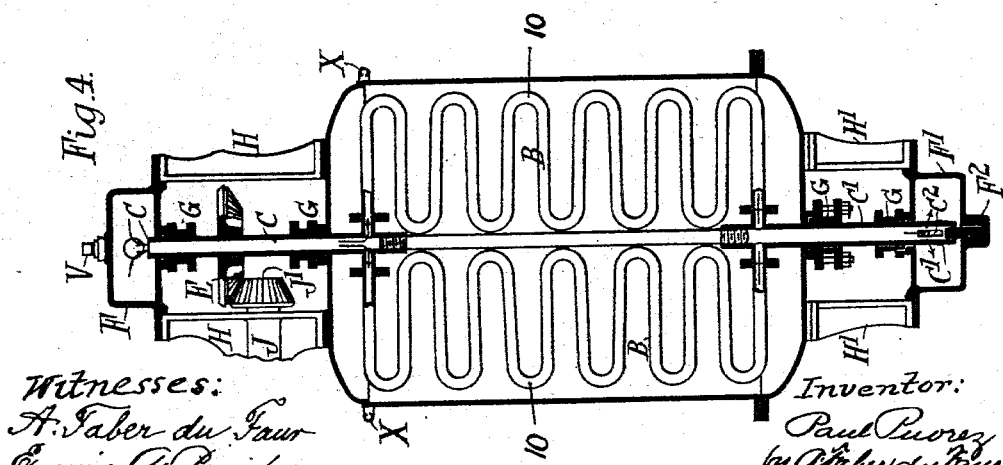
Witnesses:
A. Faber du Faur
Eugénie A. Perides.
Inventor:
Paul Puvrez
by A. Faber du Faur
Atty (No Model.) 5 Sheets—Sheet 5.
P. PUVREZ.
APPARATUS FOR PASTEURIZING OR STERILIZING AND COOLING BEER, &c.
No. 548,392. Patented Oct. 22, 1895.
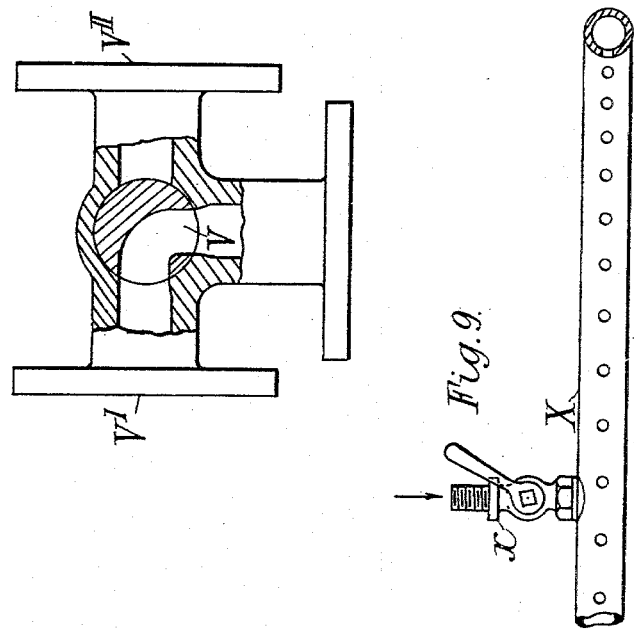
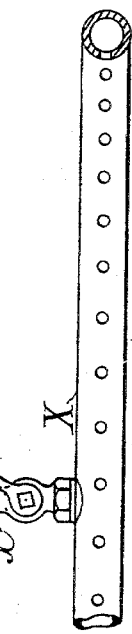
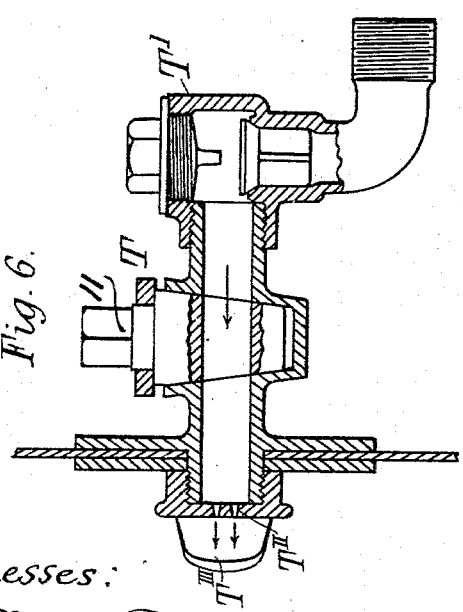
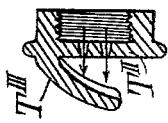
Witnesses:
A. Faber du Faur
Eugenie A. Orsider
Inventor:
Paul Puvrez
by A Faber du Faur
Atty.

UNITED STATES PATENT OFFICE.

PAUL PUVREZ, OF LILLE, FRANCE.

APPARATUS FOR PASTEURIZING OR STERILIZING AND COOLING BEERS, &c.

SPECIFICATION forming part of Letters Patent No. 548,392, dated October 22, 1895.

Application filed January 7, 1895. Serial No. 534,014. (No model.) Patented in France August 23, 1893, No. 232,279, and in Belgium September 8, 1893, No. 106,055.

*To all whom it may concern:*

Be it known that I, PAUL PUVREZ, a citizen of the Republic of France, residing at Lille, Nord, France, have invented certain new and useful apparatus for pasteurizing or sterilizing and cooling beers and for aerating or charging beers with gas before placing them in casks or in bottles, (for which I have received Letters Patent in France, No. 232,279, dated August 23, 1893, and in Belgium, No. 106,055, dated September 8, 1893,) of which the following is a specification.

My invention relates to apparatus for pasteurizing or sterilizing and cooling beers and for aerating or charging beers with gas before placing them in casks or in bottles and is described in connection with the accompanying drawings, in which—

Figure 1:
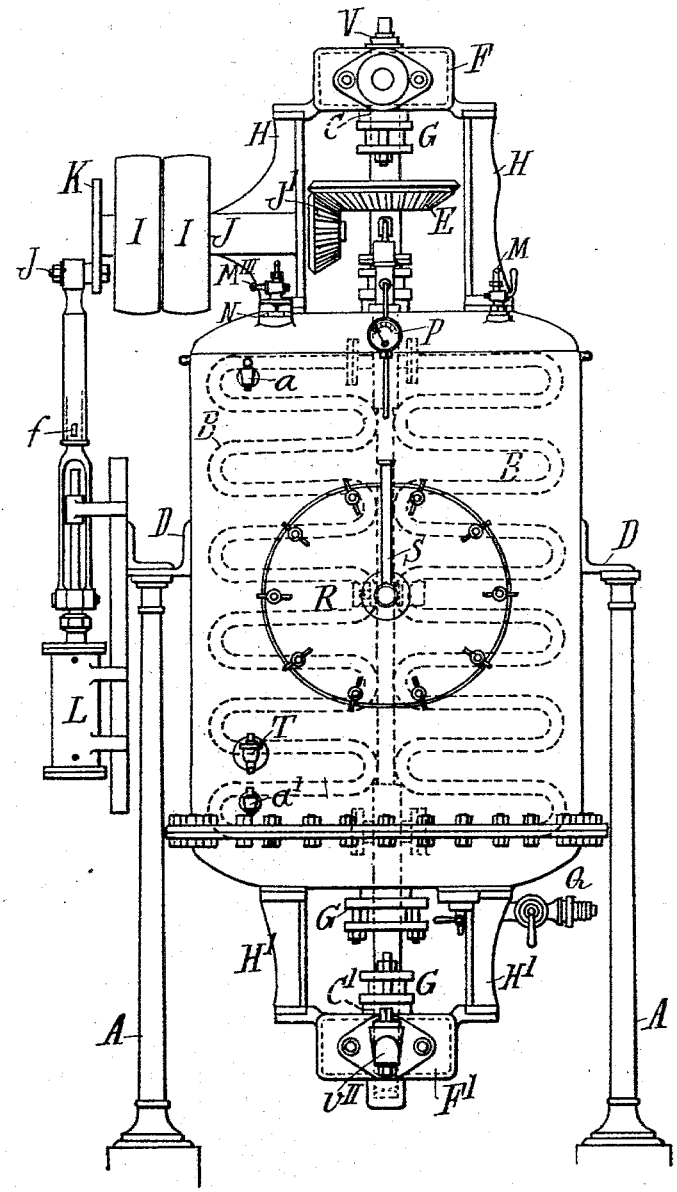
Figure 2:
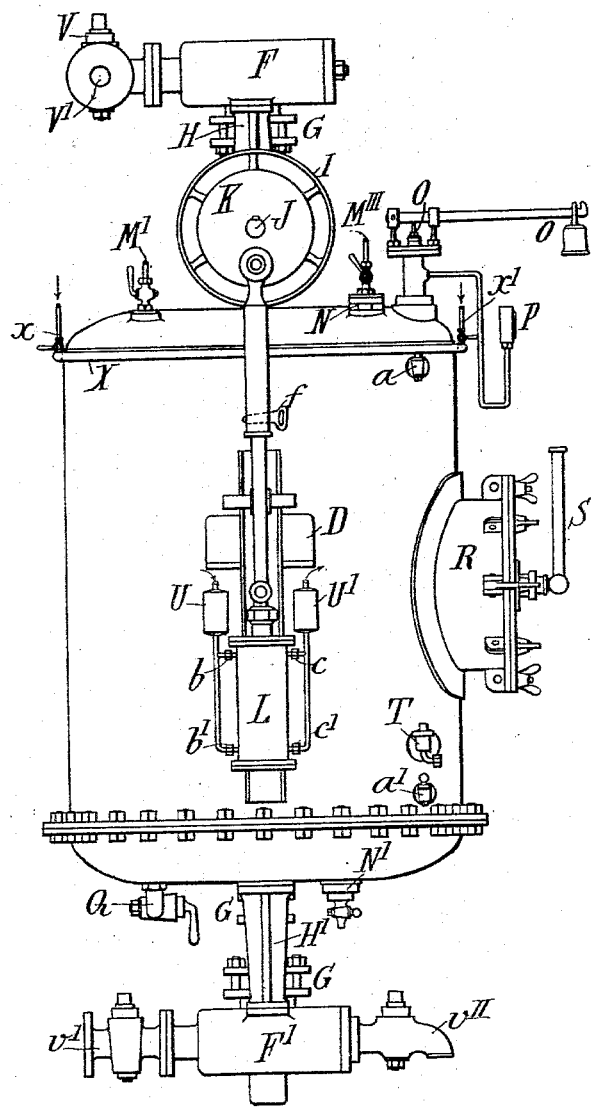
Figure 3:
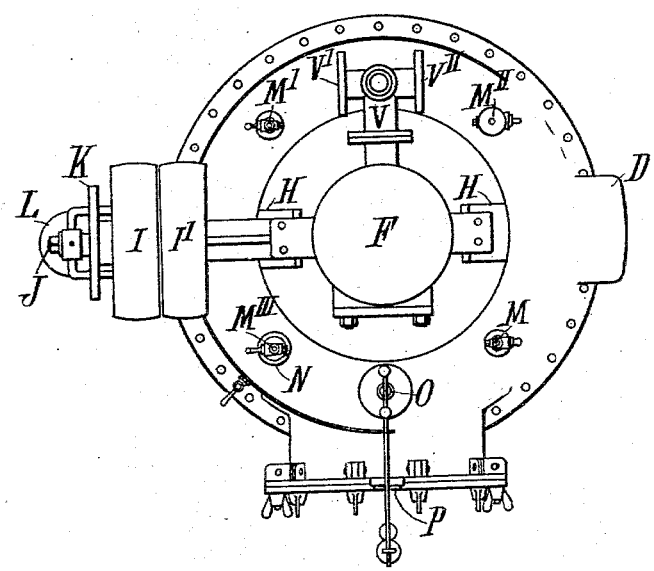

Figures 1 and 2 are two elevations drawn at right angles to each other, and Fig. 3 is a plan of apparatus constructed according to my invention. Fig. 4 is a vertical section of the apparatus on the line 4 4, Fig. 5. Fig. 5 is an elevation showing the general arrangement of the entire apparatus. Fig. 6 is a longitudinal section through the spray-producing cock. Fig. 7 is a horizontal section through the spray-producing nozzle or cap. Fig. 8 is a sectional plan of the three-way cock. Fig. 9 is a side view of a portion of the ring-tube.

Similar letters and numerals of reference designate corresponding parts.

The apparatus consists of a vertical cylinder of sheet steel, copper, or other metal closed at its two ends by heads of like metal. The lower head or bottom is bolted to the cylindrical part to enable it to be removed when necessary. The cylinder is provided in the interior with a worm-agitator B, having two or more wings 10, bolted on a partially hollow shaft of bronze, which provides for the entry and exit of hot water into and from the worm agitator. This shaft, Fig. 4, is hollow only at its two ends $C C'$, while the center portion is solid or shut off from the hollow ends, so as to compel the water entering it at one end to pass through the worm and to leave it at the other. The lower end of this shaft rests in a socket $F^2$, formed in the lower cast-iron box $F'$, and is provided with two openings $c^2$, through which enters the water from this box $F'$. This vertical shaft and with it the worm agitator are put in motion by a bevel-toothed wheel E on the upper end driven by a beveled pinion $J'$, fixed on the driving-shaft J, and its two ends enter cast-iron boxes F $F'$, into and from which is effected the entrance and exit of the hot and cold water. The hollow ends are thus open to the interior of these boxes. Suitable stuffing-boxes G are provided at the places where the shaft passes through the heads or ends of the pasteurizer P and where it passes into the boxes F $F'$ for preventing leakage at these points.

On the upper end or head of the apparatus are placed, first, the cast-iron brackets H, supporting the upper box F and the driving-shaft J, carrying the pinion $J'$, fast and loose pulleys I, and crank-disk K, operating the carbonating-pump L; second, a cock M for the entrance of pure filtered compressed air through the pipe $M^{VI}$; third, a cock $M'$ for carbonic-acid gas communicating by the pipe $M^{IV}$ with the froth-box U of the carbonating-pump L; fourth, a steam-cock $M^{II}$, connected with a pipe $M^V$; fifth, a cock $M^{III}$, placed on the bronze stopper N for the entrance of carbonic-acid gas through the pipe $T^V$; sixth, an opening, closed by a bronze stopper N, for the filling of the apparatus; seventh, a sensitive safety-valve O; eighth, a pressure-indicating gage P.

On the lower end or bottom are placed, first, cast-iron brackets $H'$, carrying the second water supply and discharge box $F'$; second, a union-cock Q for the delivery of the pasteurized beer; third, an opening closed by a bronze stopper $N'$ for the discharge of the wash-waters.

On the cylindrical part are placed, at the upper and lower parts thereof, two small gage-cocks $a$ $a'$; also, on the front of the cylinder is placed a manhole R to permit of the perfect cleaning of the interior of the apparatus, as also of entry therein, if required. In the center of the manhole-cover is screwed a sensitive thermometer S to facilitate the control of the heating and cooling temperatures. At the lower part of the cylinder is a small retaining clack-valve T, provided in the interior with a gas-sprayer to effect the carbonation when the beer has been warmed and cooled and it is ready to be put into bottles. This spray-producer, Figs. 6 and 7, consists of a shell containing a rotatable plug 11 and a small valve T', which latter prevents the passage of beer from the pasteurizer into the tube $T^V$ conveying the carbonic acid. At the inner end of the shell is secured the sprayer-cap $T^{II}$, which is provided with a number of fine holes, and with a shield or deflector $T^{III}$.

I would, however, have it understood that I do not confine myself to any particular form of sprayer, as such are well known and separately form no part of my invention. To the left of Fig. 1 on the cylinder is mounted a double-action bronze pump L, the connecting-rod of which is operated by the crank-disk K. This pump serves to finally carbonate the beer after its pasteurization. To effect this carbonation, carbonic-acid gas from any suitable gas-producer or from a steel flask $T^{IV}$, containing the same in the liquid state, is caused to enter the beer through the pipe $T^V$ and by the spray-producing cock T. When the pressure in the apparatus is in equilibrium with that of the gas coming from the reducing-valve Z, conducting the carbonic-acid gas, and consequently at the desired pressure for carbonation, the gas-supply pipe $T^V$ is removed from the clack-valve T and it is placed on the carbonic-acid supply-cock $M^{III}$, placed on the top of the apparatus. During this time the worm agitator continually agitates the body of beer, but as it displaces it only horizontally the complete carbonation would occupy too long a time, as the surface of the beer, which is in direct contact with the gas, is not renewed. It is then that the carbonating-pump is put in motion. This draws the carbonic acid, which is above the beer in the pasteurizer, through the cock M' and pipe $M^{IV}$ and discharges it energetically into the body of beer at the lower part of the apparatus through the pipe $T^{VI}$ and clack-valve T. The gas, divided into exceedingly fine particles, passes through the entire body of the beer, dissolves in it in large quantities, and that which is not dissolved in it rises to the surface, where it is again drawn off by the pump and forced into the beer until the latter has become fully saturated. Before reaching the suction-valves $b$ $b'$ of the pump the carbonic-acid gas drawn off is deprived of the froth, which might be drawn off with it in a box or chamber U, which may be supplied with any suitable strainer. Beyond the delivery side of the discharge-valves $c$ $c'$ is also another box or chamber U', within which the gas is washed before delivery into the pasteurizer. In this way it is insured that the gas thus placed in contact with the beer is deprived of all impurities or of the bad odor which it might have acquired in the body of the pump or in the tubes. There might also be added to the washing-water a few drops of the essence of hops, which perfumes and aromatizes the gas.

On the upper box F for the entry and exit of water is placed a three-way cock V for the exit of hot water at V' through the pipe $V^{III}$ and the entrance of cold water at $V^{II}$ through the pipe $V^{IV}$, according to the position given to the key. On the lower box F' are placed, first, at the back the hot-water inlet-cock $v'$, communicating with the pipe $V^{III}$; second, at the front the cold-water discharge-cock $v^{II}$. The dimensions of these cocks are sufficiently large, so that when removed from the boxes the interior of the latter can be readily cleaned.

All around the cylinder, at the part where it is united to the upper end, is placed a ring X, formed of a copper tube pierced with fine holes all around the inner face thereof directed toward the outer side of the pasteurizer. (See also Fig. 9.) This ring-tube is connected at one side to the hot-water supply-tube $V^{III}$ by a cock $x$ and tube $x^2$ and at the other side to the cold-water supply-tube $V^{IV}$ by a cock $x'$ and tube $x^3$ to enable the surface for heating or cooling to be considerably increased by causing a thin film of hot or cold water to flow down the exterior of the apparatus by opening the cock $x$ or $x'$, as may be required.

The entire interior surface of the apparatus is well tinned, in order to prevent rust or oxidation of the metal.

The apparatus is supported by two small columns A, placed underneath the brackets D, fixed to the apparatus and supported by suitable foundations.

The pasteurization or sterilization, the cooling, and the charging of the beer with gas are effected in my apparatus in the following manner: The apparatus having been thoroughly cleaned through the manhole is hermetically reclosed. A jet of steam is caused to enter it to sterilize it, and it is filled to the level of the gage-cock through the aperture N with rocked and filtered beer. The opening N is closed, and compressed air is admitted above the surface of the beer through the compressed-air cock M at a pressure of one, two, or three atmospheres, according to the description of beer to be pasteurized. This operation has for its object, by compressing the surface of the liquid, to prevent the diffusion of the alcohol, the aroma, and the carbonic-acid gas from the beer when, in the course of the following operation, it is being heated. Since the evaporation depends on temperature and pressure, an increase of pressure accordingly reduces evaporation. The apparatus being under air-pressure, hot water is caused to enter the box F' through the cock at $v'$, and consequently it will pass through the hollow portion C' of the agitator-shaft and thence into the worm agitator B. This water is supplied from a small tank containing four or five hectoliters placed higher than the apparatus—for example, on the first floor if the apparatus is on the ground floor. The agitator is caused to rotate by placing the strap or band on the fixed pulley, and the key $f$ is removed from the connecting-rod of the pump in order that the latter may not work. The hot water entering the worm agitator at the bottom heats the lower strata of beer, which, by natural physical laws and by reason of the difference in density, immediately rises to the upper part of the liquid to take the place of the cooler and consequently denser strata there found. In this way a natural vertical agitation is obtained resulting from the movement given to the liquid by the differences in density of the strata of hot and cold beer, while the worm agitator causes in the body by its rotary motion a mechanical horizontal agitation, which, combined with the natural vertical agitation, insures a perfect regularity and uniformity of temperature throughout the body of the beer. This energetic rousing or agitation prevents the liquid from becoming overheated by contact with the worm agitator whose surface continually touches fresh molecules of beer. At the same time that the heating is obtained in a perfectly regular manner the consumption of hot water is reduced almost to nothing by the fact that at the outlet from the worm-agitator box F and cock V this hot water is taken by an ordinary small steam force-pump or injector, which injector, at the same time that it returns it to the small tank from which it came, gives to it the degrees of heat which it has given up to the beer. At the same time that the heating is effected in the interior by the worm agitator the heating-surface can at will be considerably increased by causing a thin film of hot water to flow against the entire exterior surface of the apparatus by means of the perforated ring-shaped tube X, pierced with small holes directed against the sides of the apparatus, which film of hot water brings its contingent of caloric against the whole exterior surface and thus increases the rapidity of heating consequent on the excellent conductibility of metal. For the cooling, on the contrary, the water enters at the upper part through the tube $V^{IV}$ at $V'$, the box F, the hollow part C of the agitator-shaft, passes through the worm agitator from above downward, and leaves by the cock $v^{II}$ of the lower box F'. Therefore, for the cooling the same natural and mechanical agitations are produced as during the heating. When the beer is cooled to 14° or 15° centigrade, the carbonating-pump is put in operation, at the same time continuing to pass cold water through the worm agitator which is constantly turning, so as to lower the temperature as much as possible. When the sterilized beer contains a small percentage of carbonic acid due to fermentation, or when it is intended to be sold iced, the temperature is still further reduced by causing iced water to circulate within the apparatus and to flow down on its exterior until the beer has attained the desired temperature. The lower the temperature the more rapidly will the saturation be effected and the more the beer will dissolve of carbonic-acid gas.

After having been treated as above the beer is placed in casks or in bottles by means of any known and suitable form of bottling apparatus.

Having fully described my invention, what I desire to claim, and secure by Letters Patent, is—

1. In an apparatus for pasteurizing or sterilizing and cooling beers, and for aerating or charging the same in bulk with gas, the combination of a metal cylinder closed at its two ends and provided with a manhole, a worm agitator revolving within said cylinder and having a shaft hollow at its two ends, a driving gear for rotating said shaft, stuffing boxes at the top and bottom of the cylinder through which the agitator shaft passes, inlet and outlet boxes at the upper and lower ends of the cylinder into which the hollow ends of the agitator shaft open, inlet and outlet cocks on said boxes for hot and cold water, a cock on the top of the cylinder for entrance of filtered compressed air, a carbonating pump on the side of the cylinder, a cock on the top of the cylinder for carbonic acid gas communicating with froth box of the carbonating pump, a steam cock on the top of the cylinder, a stopper on the top of the cylinder through which the cylinder is filled, a cock on said stopper for the entrance of carbonic acid gas, a safety valve, a pressure gage, a cock at the bottom of the cylinder for delivery of pasteurized beer, an opening closed by a stopper for delivery of wash waters, gage cocks at the upper and lower parts of the cylinder, a thermometer, a retaining clack valve containing a sprayer, and a ring tube for hot and cold water at the upper part of the cylinder having perforations directed toward the cylinder, substantially as herein shown and described.

2. In an apparatus for pasteurizing or sterilizing and cooling beers, and for aerating or charging the same in bulk with gas, the combination of a closed cylinder, a worm agitator having a shaft hollow at its two ends, hot and cold water supplies for said agitator, means for driving said agitator, filling and discharge apertures on said cylinder, a supply for compressed filtered air, a carbonic acid gas supply, a carbonating pump connected at different levels with the cylinder for circulating the gas, and entrance and discharge apertures for wash waters, substantially as herein shown and described.

3. In an apparatus for pasteurizing or sterilizing and cooling beers, and for aerating or charging the same in bulk with gas, the combination of a closed cylinder, a rotary agitator, means for supplying said agitator with hot and cold water, filling and discharge apertures on said cylinder, a carbonic acid inlet at the lower part of the cylinder, a carbonic acid gas outlet at or near the top of the cylinder, a carbonating pump adapted for connection with the inlet and outlet for establishing a circulation of the gas, and entrance and discharge apertures for wash waters, substantially as herein shown and described.

PAUL PUVREZ.

Witnesses:
　JULES GOUTIER,
　FERNAND DEMONCHAUR.